Oct. 21, 1969 E. G. BYLANDER 3,474,297

INTERCONNECTION SYSTEM FOR COMPLEX SEMICONDUCTOR ARRAYS

Filed June 30, 1967 5 Sheets-Sheet 1

INVENTOR

ERNEST G. BYLANDER

E. Mickey Hubbard

ATTORNEY

Oct. 21, 1969 E. G. BYLANDER 3,474,297

INTERCONNECTION SYSTEM FOR COMPLEX SEMICONDUCTOR ARRAYS

Filed June 30, 1967 5 Sheets-Sheet 2

Oct. 21, 1969 E. G. BYLANDER 3,474,297

INTERCONNECTION SYSTEM FOR COMPLEX SEMICONDUCTOR ARRAYS

Filed June 30, 1967

5 Sheets-Sheet 3

Oct. 21, 1969 E. G. BYLANDER 3,474,297

INTERCONNECTION SYSTEM FOR COMPLEX SEMICONDUCTOR ARRAYS

Filed June 30, 1967 5 Sheets-Sheet 5

United States Patent Office 3,474,297

Patented Oct. 21, 1969

3,474,297

INTERCONNECTION SYSTEM FOR COMPLEX SEMICONDUCTOR ARRAYS

Ernest G. Bylander, Dallas, Tex., assignor to Texas Instruments, Incorporated, Dallas, Tex., a corporation of Delaware Filed June 30, 1967, Ser. No. 650,497
Int. Cl. H02b *1/04, 9/00*
U.S. Cl. 317—101 30 Claims

ABSTRACT OF THE DISCLOSURE

An array of circuit chips are mounted on a base sheet of thin, flexible, high temperature plastic known as H-film having a first set of gold plated, copper strip conductors thermocompression bonded to the surface of the H-film. A second sheet of H-film is disposed generally parallel to the first sheet of H-film and has a second set of strip conductors crossing over the conductors of the first set. Each circuit chip has a plurality of expanded gold contacts. In one embodiment, the expanded contacts are connected to the strip conductors of the first and second sets either by a direct thermocompression bond, by a thermocompression bonded gold jumper wire, or by an ultrasonically bonded aluminum jumper wire. In another embodiment, the expanded contacts are connected to conductors of the first set by a direct thermocompression bond, and the conductors of the second set are connected to conductors of the first set by thermocompression bonds.

This invention relates generally to microminiature electronic systems, and more particularly, but not by way of limitation, relates to high density arrays of integrated semiconductor circuits.

In digital data processing systems, the speed of the system and the size of the memory determines the quantity of data which the system can process in a given period of time and are therefore of prime interest. The fabrication cost of the system, as related to the quantity of data which the system can process in a given period of time, is also of prime importance. Digital storage and logic circuits in integrated form having very high speeds of operation have been developed and have considerable promise in digital system applications. Integrated circuit yields have ben increased to the point that a large number of logic functions can be economically performed on a single semiconductor chip. Although the logic functions on each chip can be interconnected by multilayer thin film techniques, the chip still requires a very large number of external connections. One of the principal costs involved in the construction of a digital processing system using integrated circuits is the interconnection of the chips. This cost is to a large extent a result of the vast number of interconnections which must be made.

At high clock rates, propagation delays between circuit chips become significant unless the chips are very closely spaced. Also, at high clock rates, the digital information becomes high frequency information which must be carried by transmission lines for efficient operation. When thirty or forty logic functions are formed on the same chip, the interconnections by thin film leads are usually less than about fifty mils in length eliminating propagation delay problems and also usually eliminating the requirement for transmission lines. However, the large number of connections between chips require a large number of transmission lines many times longer than fifty mils. Thus, the problem of achieving high component density within the system is frustrated as much by the large number of transmission lines required for the interconnection of the logic functions on the various chips as by any other factor. There are also many complex analog systems such as phased-array radar systems, infrared detector systems, and the like which have need for a compact microminiaturized interconnection system.

This invention is concerned with a semiconductor array comprising a thin flexible base sheet of high temperature plastic having a plurality of metal strip conductors bonded to one surface. A plurality of semiconductor chips each having a plurality of metal expanded contacts formed on one surface are bonded to the base sheet. A means is provided for interconnecting selected expanded contacts and selected strip conductors such that the semiconductor chips are connected into a common electrical system. In one specific embodiment, the strip conductors and expanded contacts have gold surfaces and the connector means comprises either a thermocompression bond between the strip conductors and expanded contacts, a gold jumper wire thermocompression bonded to the respective gold surfaces or an aluminum jumper wire ultrasonically bonded to the gold surfaces.

The invention further contemplates a thin flexible secondary sheet having a second set of strip conductors on one face thereof, the second sheet being disposed generally parallel to the first sheet with a second set of conductors generally overlying and crossing over the first set of conductors. The second set of conductors may be interconnected with the expanded contacts on the semiconductor chip, or with the first set of strip conductors, either by a direct thermocompression bond, a thermocompression bonded gold jumper wire or an ultrasonically bonded aluminum wire.

In accordance with another aspect of the invention, the array is elongated and the strip conductors on either the base shet or the secondary sheet extend to one longitudinal edge of the respective sheet. The elongated array is then folded into a small volume. This substantially shortens the distance and thus propagation delays betwen different parts of the system, and also provides easy access to the system. In another embodiment, the back surfaces of the sheets are metallized to form microstrip transmission lines.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figures 1, 8, 10:
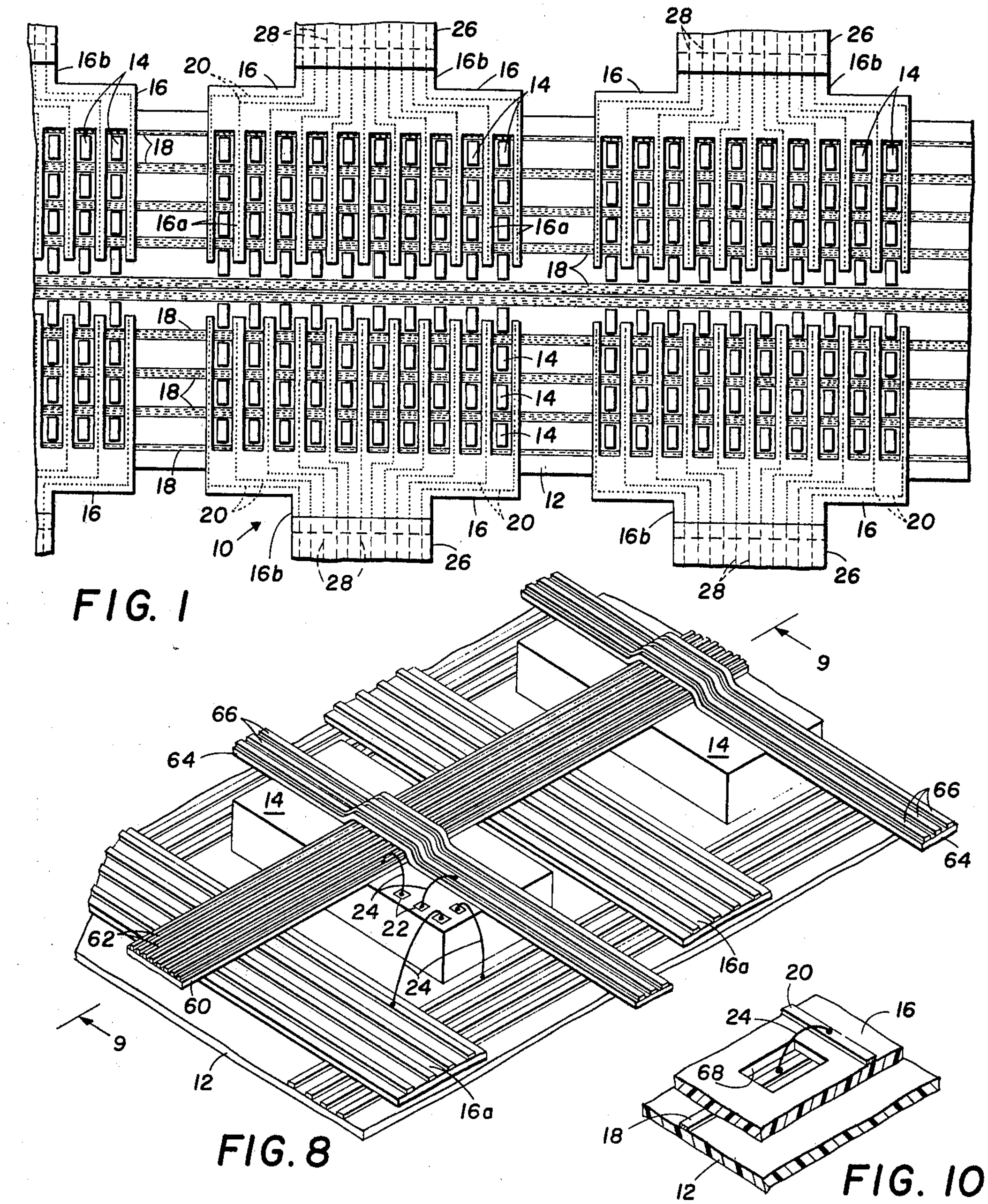
FIGURE 1 is a simplified plan view of an array fabricated in accordance with the present invention.
FIGURE 8 is a partial isometric view illustrating still another embodiment of the present invention.
FIGURE 10 is a partial isometric view illustrating still another aspect of the present invention.

Referring now to the drawings, an array constructed in accordance with the present invention is indicated generally by the reference numeral 10. The array 10 is comprised of an elongated base sheet 12 on which are mounted a plurality of chips 14 arrayed in longitudinally extending rows and transversely extending columns. A plurality of secondary sheets 16 are bonded to the base sheet 12 and have finger portions **16*a* which extend transversely of the base sheet between the columns of semiconductor chips 14, and also tab portions 16*b* which extend beyond the longitudinal edges of the elongated base sheet 12. A large number of strip conductors 18 extend longitudinally of the base sheet 12 generally between the longitudinally extending rows of chips 14. The strip conductors 18 are illustrated schematically in FIGURE 1, and in detail in FIGURE 2, although it is to be understood that a greater number of conductors can be provided if desired. A number of strip conductors 20 extend from the edges of the tabs 16*b* along the finger portions 16*a* of the secondary sheets 16, and thus extend transversely of the base sheet 12 generally over the conductors 18**.

The base sheet 12 and secondary sheets 16 are typically about 0.001 inch thick and the strip conductors 18 and 20 are typically less than 0.001 inch thick and less than 0.002 inch wide. The chips 14 are typically from about 0.004 inch to about 0.010 inch thick and may range in dimensions from about 0.020 inch on the smallest side up to the maximum permitted by integrated circuit technology, which is presently about 1.0 inch nominal diameter slices with a current goal of 3.0 inch nominal diameter slices. The chips 14 may include only a single active semiconductor element such as a transistor, or may include one or more complete functional circuits in integrated circuit form. Integrated circuit chips having thirty or forty separate logic circuits on the same chip are presently well within the state of the art. It is also to be understood that the chips may be ceramic elements having resistance elements formed on one surface or hybrid microwave processing devices such as frequency multipliers, phase shifters and the like formed by microstrip transmission lines and semiconductor devices mounted on the surface of ceramic chips. In any event, the chips 14 have a plurality of expanded metal contacts 22 formed on the top face of the substrate 14 (see FIGURE 2). Selected expanded contacts 22 are connected to selected strip conductors 18 and 20 by jumper wires, typically 0.0007 inch in diameter.

Both the base sheet 12 and the second sheets 16 are flexible, high temperature polypyromellitimide plastic, commonly referred to as H-film and sold under the trademark Kapton by DuPont. The H-film is an infusible, nonflammable material with high mechanical stability, excellent electrical properties, and excellent resistance to chemicals, water and abrasion. These properties exist throughout a wide temperature range from liquid helium temperatures to over 400° C., and the material will withstand temperatures as high as 400° C. without any apparent adverse effects. H-film clad with various metal layers either thermocompression bonded to the sheet, or bonded with a binder, such as Teflon, is presently commercially available. Although commercially available H-film clad with a thin film of copper thermocompression bonded to the H-film is particularly suited for the present invention, either Teflon film or irradiated polyethylene film to which metal films are thermocompression bonded may also be used since these plastics have similar properties. Of course, it is anticipated that additional similar stock materials having the same physical characteristics will become available in the future and will be satisfactory for practicing the present invention.

In accordance with one important specific aspect of the invention, the strip conductors 18 and 20 and the expanded contacts 22 are gold plated, and the jumper wires 24 are gold wires thermocompression bonded to the respective expanded contacts and strip conductors using conventional ball bonding equipment. The strip conductors 18 and 20 may be prepared as described in U.S. copending application, Ser. No. 638,915, entitled "Process for Fabricating Ge:Hg Infrared Detector Arrays and Resulting Article of Manufacture," filed on behalf of Bylander et al. by the assignee of the present invention. Using 0.001 inch thick H-film to which a copper film is thermocompression bonded as the stock material, the copper film is patterned by conventional photolithographic techniques to form the conductors 18 and 20. The copper strip conductors are then plated with gold as described in the above-referenced application. If the conductor pattern does not permit this approach, then the stock material can be first gold plated, then patterned using photo-lithographic techniques.

A suitable gold plating process involves an electroplating system in which the conductors 18 or 20, as the case may be, form the cathode in an acid plating solution and pure gold foil sheets form the anodes. The acid plating solution may be of the type purchased under the trade name Sel-Rex Temperex HD. An A.C. potential is applied across the cathode and anode to produce a negative current flow from the anode to the cathode during one half cycle for plating gold on the copper, and a positive current flow during the other half cycle to repel hydrogen ions from the cathode and prevent build up current is approximately 20% of the negative current. of hydrogen bubbles on the plating usrface. The positive The thickness of gold on the copper required to achieve the thermocompression bondable layer has not been measured, but the optimum thickness can be rather easily determined by an empirical approach. In general, if the gold layer is either too thin or too thick, thermocompression bonding cannot be achieved. The expanded contacts 22 are typically a solid gold layer deposited by evaporation or RF sputtering as the final step in the fabrication of the multilayer interconnection system on the integrated circuit chip 14.

The jumper wires 24 may be gold wires 0.0007 inch in diameter. In order to bond the jumper wires 24 to the various strip conductors and expanded contacts, the base sheet 12 is placed on a stage heated to a temperature from about 200° C. to about 250° C. so that the base sheet, the strip conductors and the chips 14 will all be heated generally to that temperature range, which is well below the normal melting point of either gold or copper. The capillary feeding the gold wire is typically heated to about 300° C. The capillary feeding the gold wire lowers the end of the wire, which is balled as a result of being previously severed by a flame in the conventional manner, against the gold plated conductor 18 or 20, as the case may be, and presses the balled end against the conductor. As a result of the increased pressure, the melting point of the gold is reduced and the gold wire fuses to the gold plated strip conductor to form a good electrical and mechanical connection. The capillary is then moved upwardly, playing out the gold wire as it is moved, to the expanded contact where the edge of the wire is pressed against the contact to make a second thermocompression bond. The capillary is then raised upwardly until the wire can be cut by the flame, and the remaining pigtail removed by tweezers in the conventional manner. Thus, any two reasonably adjacent strip conductors 18 or 20 may be connected to one of the expanded contacts 22 on a chip 14. Also, any two reasonably adjacent strip conductors 18 and 20 may be directly interconnected by a jumper wire using the same thermocompression techniques.

In the alternative, the jumper wires 24 may be aluminum and may be bonded to the gold plated strip conductors and expanded contacts using a conventional ultrasonic bonding process, or another suitable low temperature process. The conventional process of soldering, however, does not permit the use or strip conductors 18 sufficiently small to make the structure of the present invention commercially attractive because of the marked tendency for solder to flow between the small, closely spaced strip conductors.

The array 10 can be assembled after the base sheet 12 and secondary sheet 16 have been fabricated by first securing the chips 14 in place on the base sheet 12 using either a varnish if electrical contact is not required with the substrate of the chip, or a thermocompression bond or soldering process if electrical contact is required.

In the first case, the chips 14 may be placed in a suitable holder with the back sides of the chips facing upwardly. The back sides of the chips may then be coated with the GE varnish and the base sheet inverted, aligned, and pressed against the coated portions of the chips. Alignment of the base sheet 12 to the underlying chips 14 is easily accomplished since the base sheet 12 is highly translucent. The varnish can then be cured in the conventional manner by baking at a relatively low temperature of about 150° C. Teflon may also be used to bond the chips in place or to provide electrical insulation where needed as hereafter described.

If the substrates of the chips 14 are to be grounded, metal pads can be formed on the base sheet 12 as part of a ground strip conductor at the same time the strip conductors are formed and gold plated. The back surfaces of the chips 14 may also be gold plated. The two gold surfaces can then be thermocompression bonded to both secure the chips 14 on the base sheet 12 and provide electrical contact with the substrate of the chip. If desired, a relatively low temperature solder can be used for this purpose because of the large size of the chip and pad. The pads on the base sheet 12 may be interconnected by conductors extending longitudinally along the base sheet 12 to provide good ground contact.

The base sheet 12 may be made substantially any width or substantialy any length so that a very large number of chips 14 can be bonded to the base sheet. The secondary sheets 16 may be fabricated from a continuous strip of H-film stock and then punched out to form the individual secondary sheets 16 after the strip conductors 20 have been formed and gold plated. The secondary sheets 16 may then be secured in place on the base sheet 12 using varnish cured in the conventional manner, or any other suitable insulating material. As many of the secondary sheets 16 as desired can be made into an integral sheet and the finger portions **16*a* may be interconnected by cross members as required to facilitate handling, it being necessary only to leave the underlying strip conductors 18 on the base sheet exposed at the points where a jumper wire is to be ball bonded to the strip conductor 18**.

Figures 2, 3, 4, 5, 6, 7:
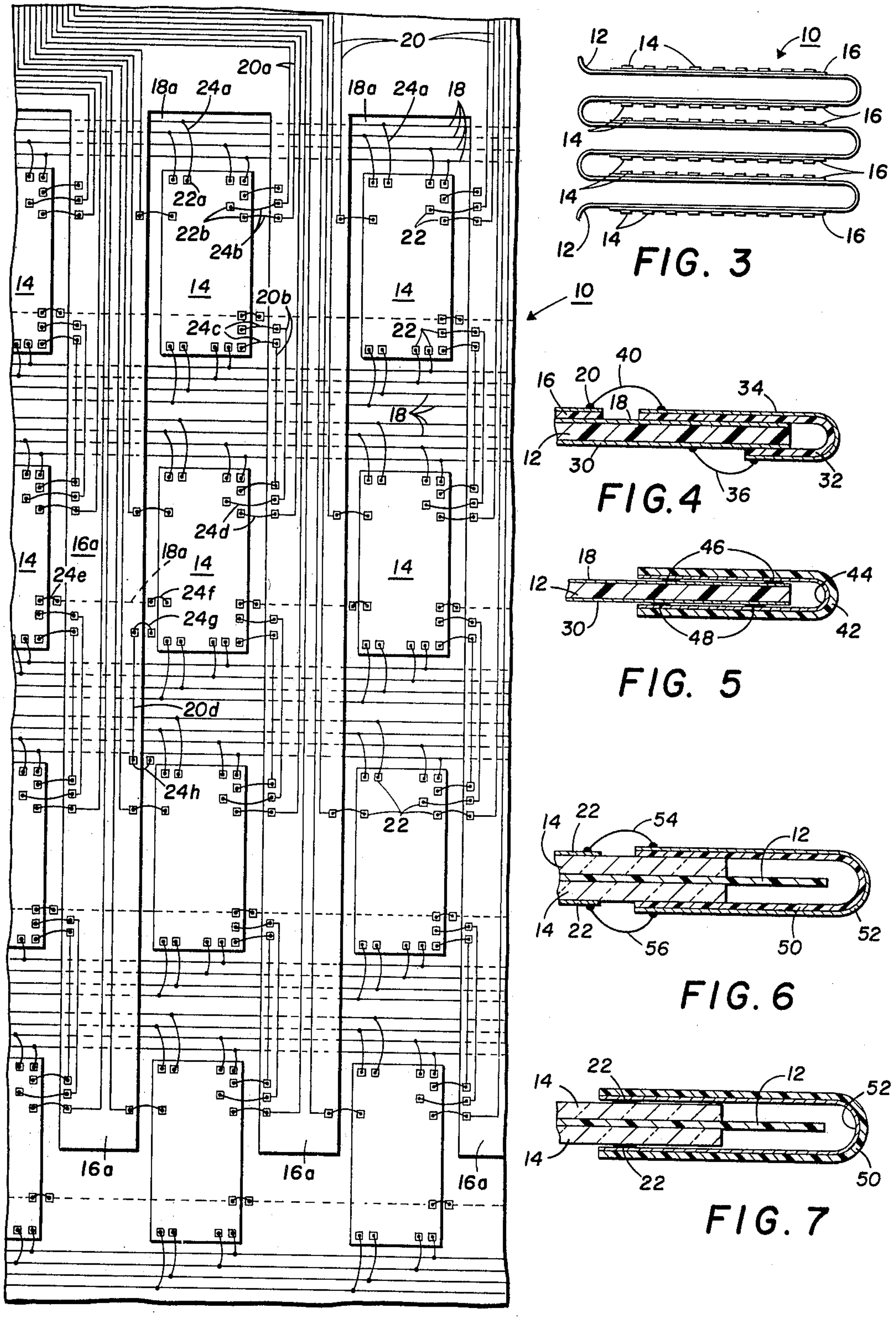
FIGURE 2 is an enlarged plan view of a small section of the array of FIGURE 1.
FIGURE 3 is a schematic end view of the array of FIGURE 1 folded in accordance with the present invention.
FIGURES 4–7 are simplified sectional views illustrating four different methods for interconnecting circuits on two sides of a base sheet in accordance with the present invention.
Figure 11:
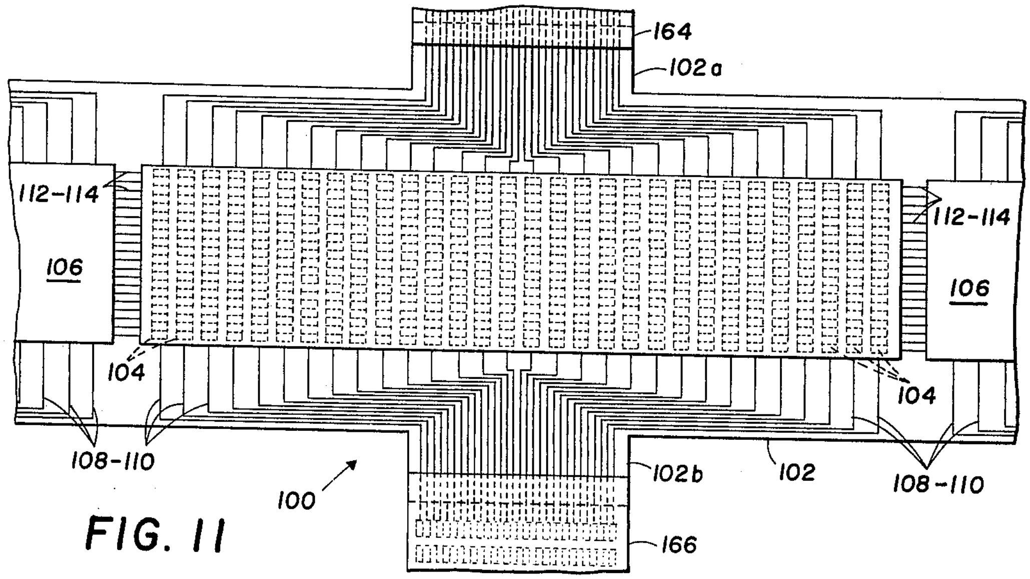
FIGURE 11 is a partial plan view illustrating still another array in accordance with the present invention.

After the array 10 has been assembled in the manner described, it may be folded in accordion fashion substantially as illustrated in FIGURE 3 so that all of the tab portions **16*b* are disposed generally in adjacent relationship. Contact can then be made with the strip conductors 20 on the tab portions 16*b* on the secondary sheets 16 by H-film connector sheets 26 (see FIGURE 1) having strip conductors 28, shown in dotted line, which are of the same size and spacing as the conductors 20 at the edge of the tab portions 16*b*. The connector sheets 26 are inverted so that the strip conductors 28 are directly in contact with the strip conductors 20. The secondary sheets 16 are then placed on a table heated to about 200°–250° C. and a very narrow tool extending across the width of the tab portion 16*b* that is heated to about 300° C. brought to bear against the surface of the connector sheet 26 to press the gold plated strip conductors together and form a direct thermocompression bond between the respective mated strip conductors. The connector sheets 26 may then be connected to the peripheral circuits of the system. The connector sheets 26** may in turn be the base sheet for the input addressing logic function, the shift registers, or other logic, or the logic for processing the stored data and reading the data out of the memory.

When the base sheet 12 is folded as shown in FIGURE 3, the tabs **16*b* are located in close proximity. Thus, by interconnecting selected tabs, remote chips in the memory can be interconnected by a conductor on the connector sheet 26 of much shorter length than by a conductor extending the length of the base sheet 12**.

The back surfaces of the base sheet 12, the secondary sheets 16, and the connector sheets 26 can be metallized to form a ground plane. Then each strip conductor forms a microstrip transmission line having a characteristic impedance determined primarily by the width of the strip conductors and the thickness and dielectric properties of the H-film or other sheet material. The entire array 10 may be coated with varnish to protect the jumper wires, and then immersed in a suitable nonconductive cooling fluid, such as oil. If necessary, insulating sheets 17 of H-film may be placed between the adjacent folds of the array as represented in FIGURE 3.

It will be appreciated that the array 10 may have an extremely high density of functional circuits. For example, if the chips 14 are 0.125 inch by 0.250 inch and have forty logic functions per chip, a base sheet four inches wide can carry about ten chips in each transverse column with 0.125 inch spacing between the ends of the chips. Then in any four inch length of the base sheet, there would be sixteen transverse columns, giving a total of one hundred sixty chips in the four inch square. Thus, there would be a total of 6400 logic functions in the four inch square, giving a density of four hundred logic functions per square inch. Assuming a total thickness of 0.025 inch for the base sheet and chips when folded, there would be forty folds per inch, giving a volumetric density of 16,000 logic functions per cubic inch. It should also be noted that by using 0.001 inch strip conductors on 0.002 inch centers, as many as fifty strip conductors could be placed on each of the fingers **16*a*, and as many as fifty strip conductors 18 placed between the adjacent ends of the chips 14. In addition, as many as one hundred twenty-five strip conductors can extend directly under the chips 14 if the chips 14 are mounted using varnish rather than being bonded to a metal pad. When using the varnish, the chips 14 can be bonded directly over the tops of the strip conductors 18** and the varnish will provide the necessary electrical insulation.

It is also important to note that the longitudinally extending strip conductors 18 and the overlying transversely extending strip conductors 20, together with the capability to interconnect the strip conductors 18 and 20, and interconnect the conductors 18 and 20 and the expanded contacts 22, substantially any expanded contact on substantially any chip in the array can be connected with substantially any other expanded contact on substantially any other chip in the array, or can be connected directly to the output of the array. In FIGURE 2 for example, jumper wires **24*a* may interconnect strip conductor 18*a* and contacts 22*a* on each chip 14 in the top longitudinal row shown in FIGURE 2 in order to provide either D.C. power, a ground connection, a clock pulse, a "set" or "reset" signal, or any other signal which must be applied to chips in the column since the strip conductors 18*a* extend throughout the memory. Individual logic inputs or logic outputs may be supplied to the respective chips 14 by the strip conductors 20, as represented by strip conductors 20*a* to contacts 22*b* and jumper wires 24*b*. Chips 14 in the same transverse column may be interconnected as by strip conductors 20b and jumper wires 24c and 24d. Adjacent chips in adjacent transverse columns may be interconnected by a strip conductor 18a on the base sheet 12 and jumper wires 24e and 24f since the strip conductor 18a passes under the finger 16a. Of course, if the chips 14 are bonded to the base sheet 12 by a nonconductive material such as varnish, then the strip conductors 18a may extend under the chips 14, thus giving added versatility for the interconnection of two remotely located chips 14. Thus, a conductive path may cross under any one of the finger portions 16a and the strip conductors 20 thereon. Similarly, the strip conductors 18 on the base sheet can be bridged by a strip conductor 20d on one of the fingers 16a and a pair of jumper wires 24g and 24h**.

As mentioned, it will usually be desirable for the strip conductors 18 and 20 to be microstrip transmission lines for carrying high frequency information. This can be achieved by providing a metal layer on the opposite side of each H-film sheet to provide a ground plane. The characteristic impedance of the microstrip transmission line will then be a function of the thickness and insulation properties of the H-film, and the width of the strip layers 18 and 20. Of course, it will be appreciated that if a metal ground plane is provided on the back surface of the secondary sheet 16, then the secondary sheets must be electrically insulated from the microstrip transmission lines 18. This can be achieved using varnish or other suitable nonconductive bonding material to bond the secondary sheet 16 to the base sheet 12.

In the event a ground plane is not required for the base sheet 12, strip conductors can also be provided on the back face of the base sheet as illustrated in FIGURE 4 by the reference numeral 30. In such a case, the conductors 30 on the back face of the base sheet 12 may be connected to either the conductors 18 on the front face of the base sheet 12 or the strip conductors 20 on the secondary sheet 16 by an H-film strap 32 having strip conductors 34 formed thereon and jumper wires 36, 38, and 40. The H-film of the strap 32 may be bonded over the strip conductors 18 and 30 using varnish as heretofore described. It will be noted that the ends of the strap 32 on the bottom surface is staggered from the end of the top surface. This permits first the jumper wire 36 to be bonded, then the jumper wires 38 and 40, while allowing the jumper wire 36 to overhang the edge of the heated table.

In the event only the conductors 18 on the front face of the base sheet 12 are to be connected to the conductors 30 on the back face of the base sheet 12, an H-film strap 42 having gold plated strip conductors 44 may be inverted, when compared to the strap 32, so that the ends of the strip conductors 44 directly contact the coresponding strip conductors 18 and 20 as shown in FIGURE 5. Then thermocompression bonds 46 may be made between the ends of the strip conductors 44 and the strip conductors 18 and thermocompression bonds 48 made directly between the ends of the strip conductors 44 and the strip conductors 30.

In some instances, it may be desirable to mount chips 14 on both faces of the base sheet 12 as illustrated in FIGURE 6. In such a case, a strap 50 having strip conductors 52 may be used to interconnect the expanded contacts 22 on the chips 14 by bonding the ends of the strap 50 to the surfaces of the chips 14 using varnish and then interconnecting the ends of the strip conductors 52 and the expanded contacts 22 using ball bonded jumper wires 54 and 56. Or in the alternative, the strap 50 may be inverted as shown in FIGURE 7 and the ends of the strip conductors 52 thermocompression bonded directly to the expanded contacts 22 merely by heating the chips 14 to about 200° C. and pressing the ends of the strip conductors against the expanded contacts using a tool heated to about 300° C.

In the event it is desired to put chips and/or conductors on both faces of the base sheet and also have ground planes, two H-film sheets may be provided with metallized ground planes, and disposed back to back with the ground plane sandwiched between the H-film base sheets.

Figure 9:
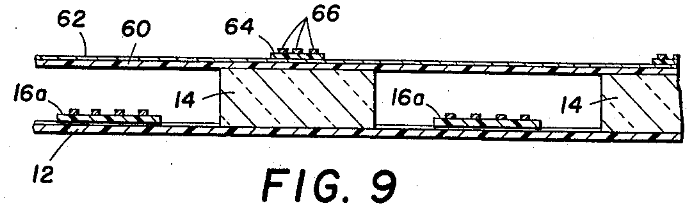
FIGURE 9 is a sectional view taken substantially on lines 9—9 of FIGURE 8.

In the event the strip conductors 18 and 20 do not provide a sufficient number of strip conductors, a second level of longitudinally extending strip conductors may be provided by an H-film sheet 60 having strip conductors 62, and a second sheet of transversely extending conductors can be provided by H-film strips 64 having strip conductors 66 thereon as shown in FIGURES 8 and 9. The H-film strips 60 and 64 can be mounted in crossed configuration and bridging the adjacent chips 14. H-film strip 60 may be mounted directly on the longitudinally extending rows of chips 14 using varnish cured in the conventional manner, and the H-film strips 64 may be mounted over the conductors 62 on the longitudinally extending strips 60 and on the surfaces of the transverse rows of chips 14 with varnish. Then the strip conductors 62 and 66 can be connected to selected expanded contacts 22 using ball bonded jumper wires 24 as heretofore described, or interconnected using jumper wires.

In the alternative, the strip 60 can be inverted so that the strip conductors 62 directly engage expanded contacts 22 on the surface of the chip 14, and a thermocompression bond made between the contacting portions of the expanded contacts 22 and the strip conductors 62. If the strip 60 is inverted in this manner, the strip 64 may also be inverted and the strip conductors 66 directly thermocompression bonded to selected expanded contacts on the top surface of the chip 14. Of course, a metal ground plane may be included on the back surface of either or both of the H-film strips 60 and 64 provided that adequate insulation is placed between crossing strip conductors and the ground plane.

Another aspect of the invention is illustrated in FIGURE 10. A strip conductor 18 on the base sheet 12 can be connected to a strip conductor 20 on a secondary sheet 16 by a jumper wire 24 extending through an opening 68 in the secondary sheet 16 which overlies the conductor 18. The jumper wire 24 may be a gold wire thermocompression bonded to the conductors, or an aluminum wire ultrasonically bonded as heretofore described. It should also be appreciated that the chips 14 can be mounted on the secondary sheet 16 and the expanded contacts on the chips connected to the strip conductors 18 on the base sheet 12 through openings in the secondary sheet 16 substantially as illustrated in FIGURE 10. The aperture 68 may be formed either mechanically or chemically.

Another array in accordance with this invention is indicated generally by the reference numeral 100 in FIGURES 11–17. The array 100 is comprised of base sheet 102, a plurality of integrated circuit chips 104, and a secondary sheet 106. The base sheet 102 and the secondary sheet 106 are both of the same material as the base sheet 12 heretofore described and have strip conductors formed thereon in the same manner.

Figure 13:
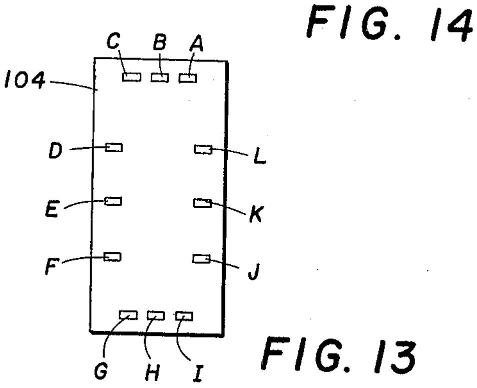
FIGURE 13 is a plan view of a chip used in the array of FIGURE 11.

The chips 104 are typically integrated semiconductor circuits and for purposes of illustration have twelve expanded gold contacts lettered A–L as indicated in FIGURE 13. It will be understood, however, that the integrated circuit chips 104 may have a much larger number of expanded contacts, and may be of substantially any size as heretofore described in connection with chips 14. The chips 104 are arranged in columns extending transversely of the base sheet 102, and in rows extending longitudinally of the base sheet 102, as represented by the dotted outlines in FIGURE 10. The chips 104 are secured to the base sheet by thermocompression bonds between the expanded contacts on the chips and strip conductors on the base sheet 102. The secondary sheet 106 is secured to the base sheet 102 by thermocompression bonds between the strip conductors on the two sheets, as will presently be described in detail.

Figure 14:
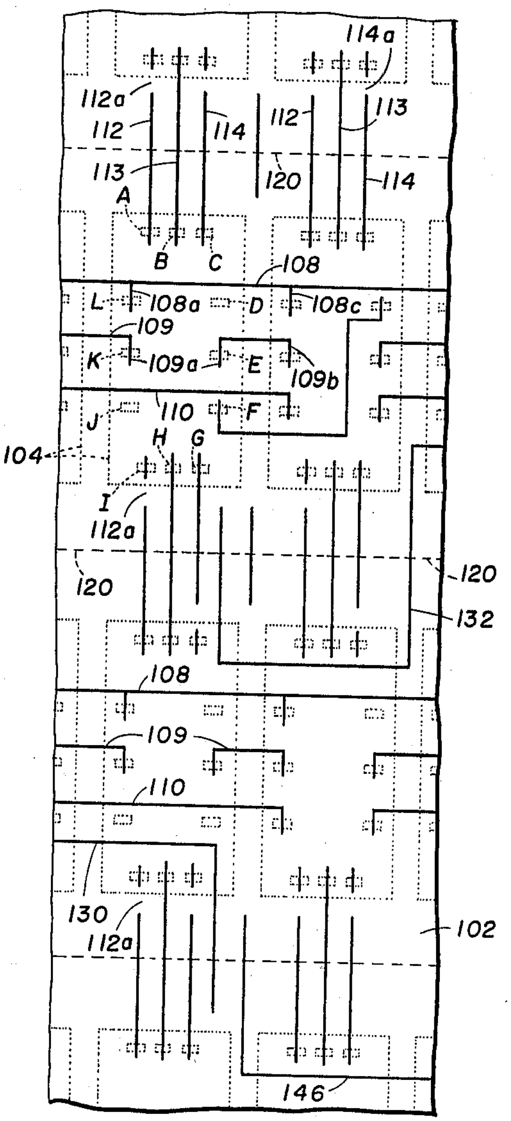
FIGURE 14 is a plan view of the base sheet of the array of FIGURE 11 illustrating the positions of the chips in dotted outline.

The strip conductors on the base sheet 102 are patterned as shown in FIGURE 14 where the dotted oulines 104 represent the position the chips 104 occupy on the base sheet 102. Three strip conductors 108, 109, and 110 extend generally transversely of the base sheet 102 beneath each transversely extending column of chips 104. These three strip conductors are representative of a large number of strip conductors which may extend beneath each column of chips. Conductor 108 is continuous and is disposed slightly offset from contacts L and D of each of the chips 104. A leg 108*a* extends under each of the expanded contacts L of each chip 104. Thus, the same contact of all chips in the column are interconnected by the conductor 108, such that conductor 108 might represent a power supply, a clock input, or a "set" or "reset" function if desired. Strip conductor 109 is interrupted and has legs 109*a* and 109*b* which extend over expanded contacts E and K, respectively, of each successive chip 104 in each transverse column. Thus, the strip conductor 109 might represent the serial interconnections of output to input of a series of flip-flops in a shift register or the like. Strip conductor 110 is also interrupted, and is provided to interconnect the F contact of one chip 104 and the J contact of the second chip 104, skipping the adjacent chip 104. Thus, it will be noted that any one of the conductors 108, 109, or 110 can be selectively connected to any one of the conductors in the row merely by providing the downturned leg, or can be interrupted to interconnect any two or more contacts in the row of contacts.

As mentioned, the three strip conductors 108–110 are merely representative of a large number of strip conductors which could extend generally transversely under the column of chips, the only requirements being that the conductors be offset from the conventional expanded contacts. Of course, if the expanded contacts were selectively eliminated or selectively masked by an insulating layer, the conductors could be placed in substantially any pattern.

Three strip conductors 112, 113, and 114 are also provided on the base sheet 102 and extend generally longitudinally between the G, H, and I contacts of the chip 104 in one transverse column and the A, B and C contacts, respectively, of the adjacent chip in the adjacent transverse column. The center portions of the conductors 112–114 are always left to provide a bonding strip for the strip conductors on the secondary sheet 106, which will presently be described. Also, at least a portion of each strip conductor 112–114 is always provided under the expanded contact areas A, B, C and G, H, I to provide a uniform means for mechanically securing the ends of the chips 104 to the base sheet. The electrical circuit to any one of the expanded contacts A, B, C, G, H or I of any chip can be selectively opened by eliminating a portion of the strip conductor between the center bonding strip and the portion overlying the contact C, as represented at 114*a*.

Figure 15:
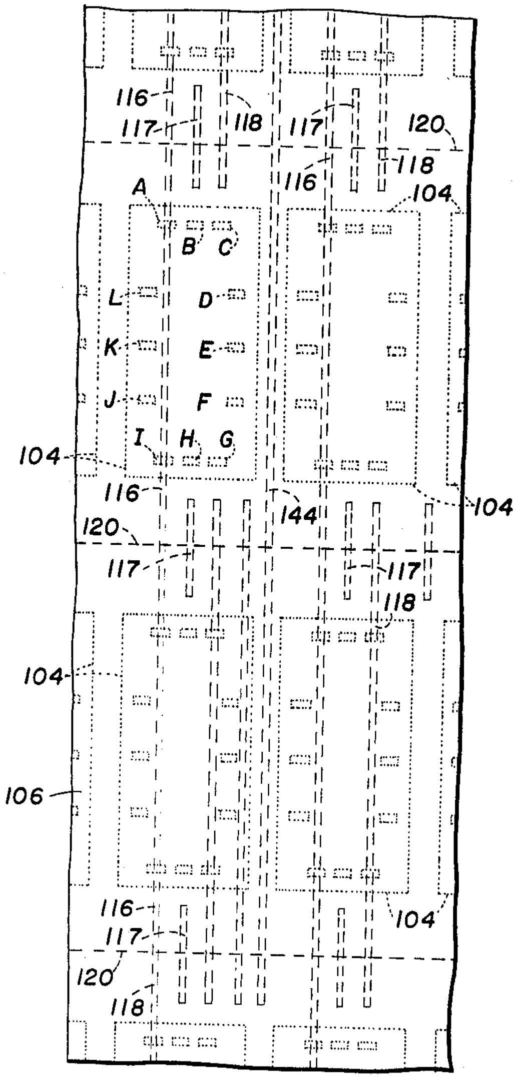
FIGURE 15 is a partial plan view of the back side of the secondary sheet of the array of FIGURE 11 showing the positions of the chips in dotted outline.

The secondary sheet 106 has three longitudinally extending strip conductors 116, 117 and 118, as shown in FIGURE 15, which are spaced to be aligned with the conductors 112, 113 and 114 on the base sheet 102. A portion of each of the conductors 116–118 which is positioned to overlie the center portion of the conductors 112–114 is always left to provide a means for uniformly securing the secondary sheet to the base sheet by thermocompression bonding the strip conductors 116–118 to the conductors 112–114, respectively, along common lines 120 extending transversely of the base sheet between the transversely extending columns of chips 104.

Figures 12, 16, 18:
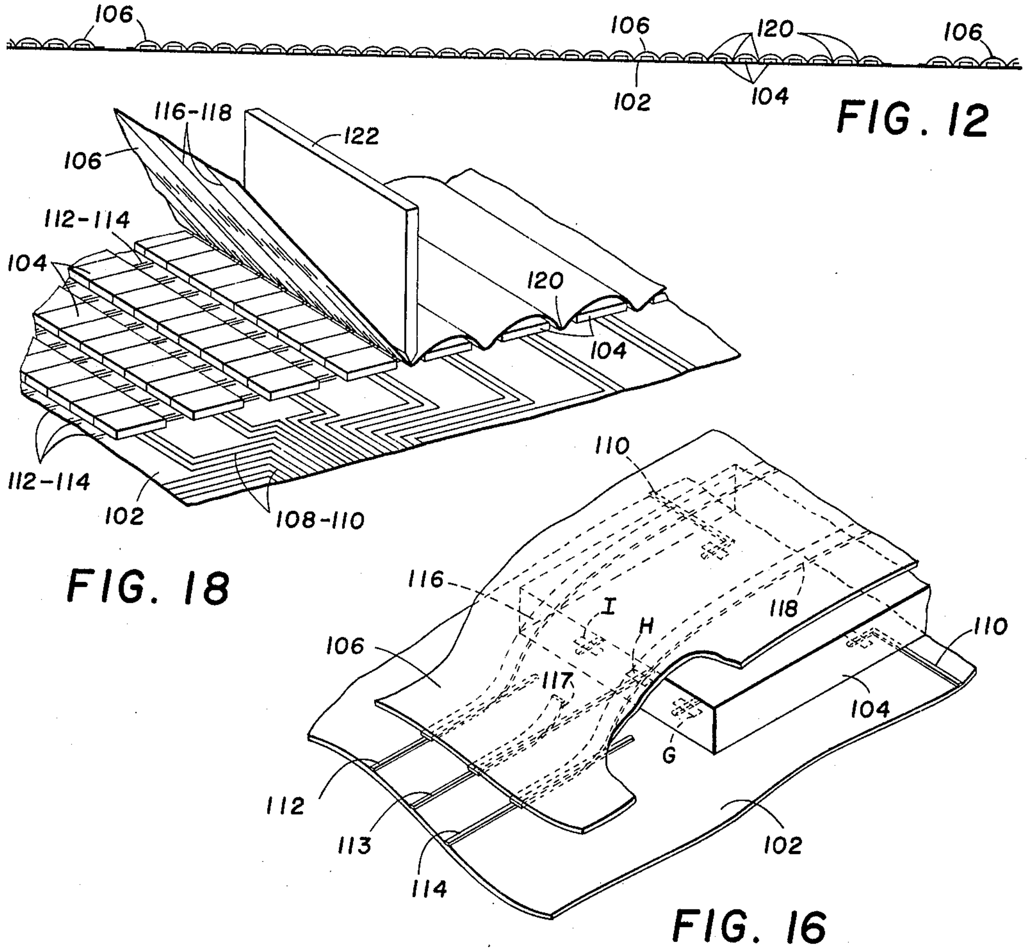
FIGURE 12 is an edge view of the array illustrated in FIGURE 11.
FIGURE 16 is a partial isometric view, partially broken away, illustrating details of construction of the array of FIGURE 11.
FIGURE 18 is an isometric view illustrating the process for fabricating the assembly of FIGURE 11.

The assembly 100 may be fabricated by first aligning the chips 104 in the respective transverse columns with the expanded contacts A–L facing upwardly. The holder, and therefore the chips, is then heated to about 200°–225° C. The base sheet 102 is then inverted and aligned with the expanded contacts on the chips. A heated tool is then brought to bear on the back side of the H-film base sheet 102 to press the respective strip conductor against the overlying expanded contact to form a thermocompression bond. The thermocompression bonds are adequate to hold the chips in place. Next, the base sheet 102 and chips 104 are placed on a heated table with the back side of the chips and the conductors 112–114 facing upwardly. The secondary sheet 106 is then applied face down so that the conductors 116–118 face the conductors 112–114. This procedure is represented in FIGURE 18. With the conductors 116–118 aligned with the underlying conductors 112–114, a narrow elongated tool 122 heated to about 300° C. is then brought to bear on the back side of the secondary sheet 106 to form the thermocompression bonds 120 between strip conductors 116–118 in the underlying conductors 112–114, respectively.

The resulting structure is perhaps best illustrated in the partial isometric view of FIGURE 16. It will be noted that where the strip conductor on the secondary sheet, either conductor 116, 117 or 118, is continuous, a continuous conductor extends around the back side of the chip 104, and the chip 104 serves to physically separate and therefore electrically isolate the conductors 116–118 from the conductors 108–110 extending under the chips 104. The back side of the chip 104 is preferably provided with an insulating layer even when the secondary sheet 106 is arched up out of contact with the chip 104. When an insulating sheet is provided on the back side of the chip 104, the secondary sheet 106 can be made to fit tightly against the back side of the chip if desired. However, by providing an excess length to the secondary sheet 106 to form an arch, an increased space is provided which promotes more efficient cooling as will presently be described.

Figure 17:
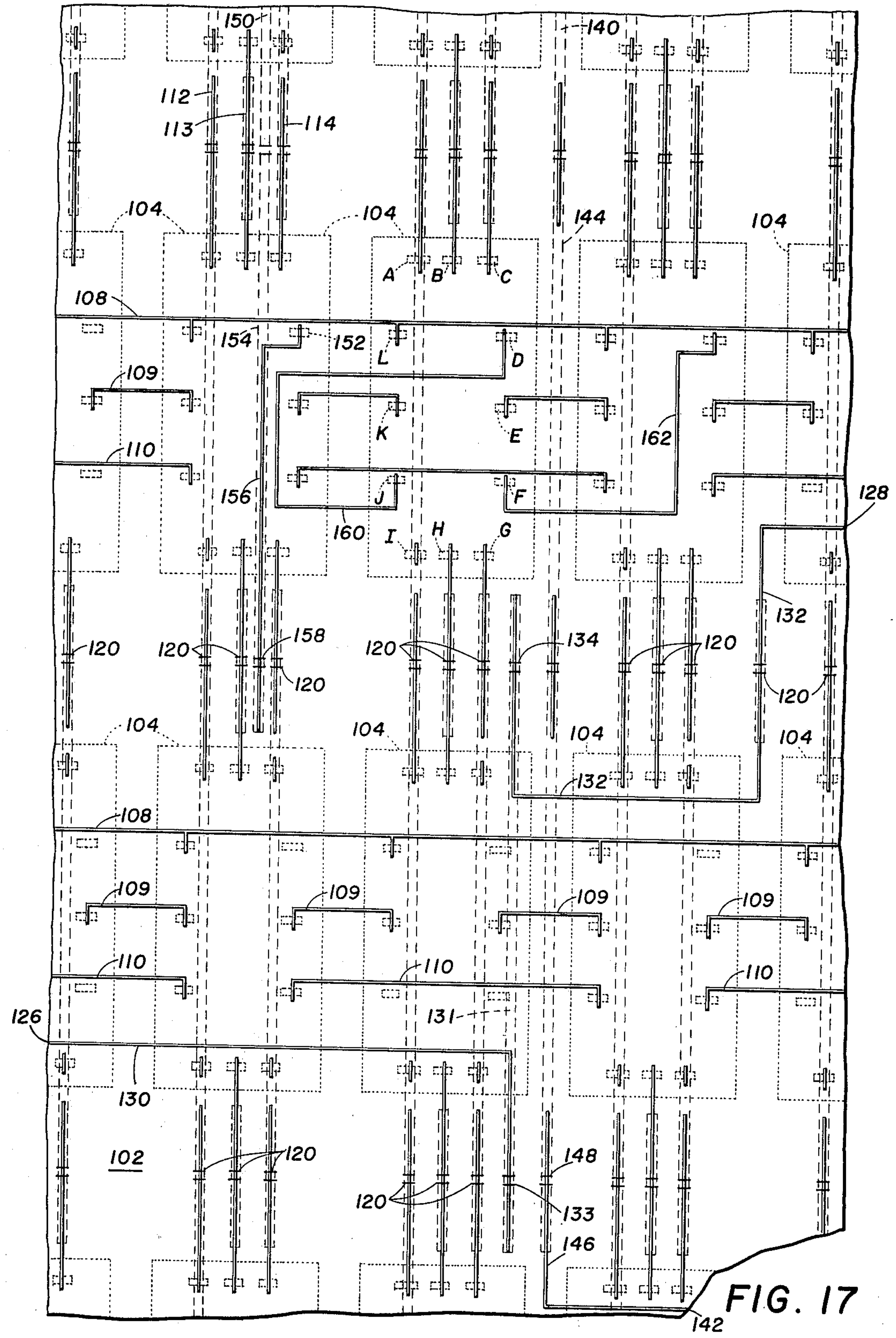
FIGURE 17 is a plan view of a section of the array of FIGURE 11.

As previously mentioned, conductor 108 interconnects expanded contact L of all chips 104 in a single transverse column. Conductors 109 interconnect the E contact of each chip with the K contact of the next succeeding chip, and conductor 110 interconnects the F contact and the J contact of every other chip. As illustrated in FIGURE 17, conductors 112–114 and 116–118 interconnect the chips in the longitudinal columns in the same basic manner. Thus, the A contacts of all chips 104 in a longitudinally extending row are interconnected by conductor 116 on the secondary sheet and the conductors 112 on the base sheet, the current path being from conductor 116, through the thermocompression bond 120, to the conductor 112, and through the conductor 112 to contact A. Since conductors 112 are interrupted at 112*a*, the I contacts of the chips are left open. Conductors 113 on the base sheet serially interconnect the H and B contacts of all of the chips 104 in the longitudinally extending column. Conductor 117 terminates at each end and merely provides a means for mechanically fastening the secondary sheet to the base sheet by the thermocompression bond 120. Conductors 118 on the secondary sheet, together with conductors 114 on the base sheet, interconnect the G contact and the C contact of every other chip in the longitudinally extending columns. Thus, it will be noted that the contacts on the chips 104 lying in each longitudinally extending row may be interconnected in substantially any manner.

At this point, it has been demonstrated how contacts on chips in the same transverse column or the same longitudinally extending rows can be interconnected in an orderly fashion. It should be appreciated, however, that since the strip conductors can be made as small as 0.001 inch in width, and since the chips may have a much greater width, a very large number of conductors can be provided in both the transverse and longitudinal directions, thus permitting interconnects between chips in relatively remotely located transverse columns. Also it is important to note that each chip may have one or more individual inputs or outputs extending under the column of chips to the longitudinally extending edge of the base sheet. An important aspect of the invention. however, is that substantially any two chips in the array can be interconnected without regard to the columns or rows in which the chips are located. For example, it will be noted that the space between expanded contacts A, B, C and expanded contacts D and L, and also the space between contacts F and J and contacts G, H and I provide two unobstructed paths for transverse conductors on the base sheet 102. Similarly, the space between the adjacent conductors 118 and 116 provides an unobstructed passageway for strip conductors on the secondary sheet extending longitudinally of the array. Thus, points 126 and 128 on the base sheet, for example, can be interconnected by a circuit comprised of a conductor 130 formed on the base sheet 102, conductor 131 formed on the secondary sheet 106, and conductor 132 formed on the base sheet 102 together with the two thermocompression bonds 133 and 134. Similarly, points 140 and 142 may be interconnected by a conductor 144 on the secondary sheet 106 and conductor 146 on the base sheet 102 through thermocompression bond 148. Similarly, point 150 may be connected to expanded contact 152 by conductor 154 on the secondary sheet 106, conductor 156 on the base sheet 102, and thermocompression bond 158. Of course, these are but examples of the many types of interconnections which can be made to interconnect substantially any two points in the array. Thus, the array 100 is equivalent to a two-sided circuit board with free access at substantially any point between the two sides of the board. Of course, depending upon the particular circuit, considerable freedom is also provided in interconnecting various expanded contacts on the same chip or different chips as represented by conductors 160 and 162 on the base sheet 102.

Once the apparatus 100 is assembled, there are no semiconductor components exposed, only the continuations of the transversely extending conductors which terminate at side tabs 102*a* and 102*b* are exposed for connection to the circuit. Connection can readily be made to the conductors on tab 102*a*, for example, by a second H-film sheet 164 having mating strip conductors on one face thereof which are aligned with and directly thermocompression bonded to the respective conductors on the base sheet 102 as heretofore described in connection with array 10. If desired, a subarray, such as represented at 166, may be bonded to one of the tabs 102*a* or 102*b* to perform addressing and processing functions. The subarray 166 can be fabricated in the same manner. The back faces of the base sheet 102 and the secondary sheet 106 may be metallized to provide a ground plane and thus make all strip conductors on the two sheets microstrip transmission lines having a characteristic impedance determined by the width of the line, the thickness of the H-film sheet, and the dielectric properties of the H-film sheet.

The array 100 can be folded as previously described in connection with the array 10 and as illustrated in FIGURE 3, rolled into a cylinder, or otherwise folded and placed in a suitable cooling fluid, such as oil. If the secondary sheet 106 is arched upwardly from the back side of the columns of chips 104, the sheets form fluid ducts through which cooling fluid may be systematically forced to promote efficient cooling.

It is important to note that the process for fabricating the array 100 can be almost completely automated. The base sheet 102 can be formed using commerically available H-film stock clad with thermocompression bonded copper. If desired, a gold sheet could also be thermocompression bonded to the H-film without the intermediate copper layer. The strip conductors may be formed on the base sheet 102 after the copper sheet has been gold plated as heretofore described, or the copper sheet can be partially patterned so that all strip conductors are interconnected to permit gold plating, then portions of the pattern selectively removed to form the single conductors. The secondary sheet 106 can be fabricated in the same manner.

The individual logic circuits on the integrated circuit chips may be individually tested, then interconnected using conventional multilevel interconnection techniques and tested again. The columns of chips 104 can then be loaded into a heated holder and all thermocompression bonds in a transverse column made simultaneously by a heated tool having points at the positions of all expanded contacts. The secondary sheet 106 can then be bonded to the base sheet using a single elongated tool as illustrated in FIGURE 18. Since the H-film is transparent, alignment for both bonding procedures is very simple and can be automated.

It is very difficult to adequately test a multifunction block before it is incorporated into the system. Thus after the array 100 has been completely assembled and tested, any malfunctioning chips can be relatively easily replaced merely by cutting out a portion of either the base sheet or the secondary sheet to permit removal and replacement of the faulty chip, merely by breaking the thermocompression bonds and rebonding the beads to the chips, and then repositioning the cut-out portion of the sheet and rebonding the mating conductors.

In co-pending U.S. application S.N. 562,238, now abandoned entitled Process for Fabricating High Density Integrated Circuit Array and Product, filed on behalf of Barnes, et al., by the assignee of the present invention, a process is described for fabricating integrated circuits on both faces of a semiconductor slice. It will also be appreciated that such circuit chips are suited for use in the array 10 and particularly in the array 100. In the array 100, the metal conductors on the base and secondary sheets may be directly thermocompression bonded to the metal contacts on the respective sides of the chips. If desired H-film strips can extend through the loops in the secondary sheet shown in FIGURE 12 and the conductors on the strips can be bonded to the contacts on the top side of the chip to provide another level of interconnection. This can be done on both sides of the chip. if desired, by extending the strips at right angles.

Although preferred embodiments of the invention have been described in detail, it is to be understood that various changes, substitutions and alterations can be made therein without departing from the spirit and scope of the invention as defined by the appended claims.

What is claimed is:

1. The semiconductor array comprising:
a thin flexible sheet of nonconductive plastic having a plurality of metal strip conductors bonded to one surface,
a plurality of electronic chips bonded to said one surface of the sheet of plastic, each chip having a plurality of metal expanded contacts formed on one surface, and
connector means interconnecting selected expanded contacts and selected strip conductors such that the semiconductor chips are connected into a common electrical system.

2. The semiconductor array defined in claim 1 wherein:
the strip conductors and the expanded contacts have gold surfaces, and
the connector means comprise gold jumper wires thermocompression bonded to the gold surfaces.

3. The semiconductor array defined in claim 1 wherein:
the strip conductors and the expanded contacts have gold surfaces, and
the connector means comprise aluminum jumper wires ultrasonically bonded to the gold surfaces.

4. The semiconductor array defined in claim 1 wherein:
the selected expanded metal contacts are disposed against the selected strip conductors, and
the connector means comprise a thermal bond between the contacting surfaces of the strip conductors and the expanded contacts.

5. The semiconductor array defined in claim 4 wherein the strip conductors and the expanded contacts have gold surfaces and the contacting gold surfaces are thermocompression bonded.

6. The semiconductor array comprising:

a thin flexible sheet of nonconductive plastic having a plurality of metal strip conductors disposed on one side, a plurality of electronic chips bonded to said one surface of the sheet of plastic, each chip having a plurality of metal expanded contacts formed on one surface, connector means interconnecting selected expanded contacts and selected strip conductors, a second thin flexible sheet of plastic having a plurality of metal strip conductors bonded to one surface, the sheet being disposed generally parallel to the first sheet with the strip conductors on the second sheet crossing over the strip conductors of the first sheet, and connector means interconnecting selected strip conductors on the second sheet and selected expanded contacts on the electronic chips such that the electronic chips are connected into a common electrical system.

7. The semiconductor array defined in claim 6 wherein:

the second thin flexible sheet is bonded to the first sheet over a substantial portion of its area.

8. The semiconductor array defined in claim 7 wherein:

the second sheet is mounted over portions of the strip conductors on the first sheet with the strip conductors on the second sheet exposed, and the connector means comprise jumper wires bonded to the respective strip conductors and expanded contacts.

9. The semiconductor array defined in claim 7 wherein:

the second sheet is bonded to the surface of the first sheet opposite from the surface on which the strip conductors on the first sheet lie with the strip conductors on the second sheet disposed adjacent the first sheet, the first sheet has openings exposing the selected strip conductors on the second sheet, and the connector means comprise jumper wires interconnecting the expanded contacts and the respective strip conductors which extend through the openings in the first sheet.

10. The semiconductor array defined in claim 6 wherein the second sheet is bonded to the semiconductor chips.

11. The semiconductor array defined in claim 8 wherein the connector means comprise jumper wires bonded to the respective expanded contacts and respective strip conductors.

12. The semiconductor array defined in claim 8 wherein the strip conductors on the second thin flexible sheet are disposed against the expanded contacts on the semiconductor chips and the connector means comprise a thermal bond between the adjacent portions of the metal forming the strip conductors and expanded contacts.

13. The semiconductor array comprising:

a thin flexible sheet of nonconductive plastic having a plurality of metal strip conductors disposed on one surface, a plurality of electronic chips bonded to said one surface of the sheet of plastic, each chip having a plurality of metal expanded contacts formed on one surface, certain of said expanded metal contacts disposed against the respective strip conductors on the first sheet and thermally bonded thereto, connector means interconnecting selected expanded contacts and selected strip conductors, a second thin flexible sheet of high temperature plastic having a plurality of metal strip conductors bonded to one surface, the second sheet being disposed generally parallel to the first sheet with at least a portion of the strip conductors on the second sheet crossing over at least a portion of the strip conductors on the first sheet, and connector means interconnecting selected strip conductors on the first sheet and selected strip conductors on the second sheet such that the electronic chips are connected into a common electrical system.

14. The semiconductor array defined in claim 13 wherein:

the connector means comprise jumper wires bonded to the strip conductors on the first sheet and the respective strip conductors on the second sheet.

15. The semiconductor array defined in claim 13 wherein the selected strip conductors on the second sheet are in direct contact with the selected strip conductors on the first sheet and the interconnector means comprise a thermal bond between the adjacent portions of the respective strip conductors.

16. In a semiconductor network, the combination of:

a first thin flexible insulating sheet having a first strip conductor on one face thereof extending generally in a first direction and second strip conductors disposed on said one face on opposite sides of the first strip conductor, an insulating body disposed over the first strip conductor, and a thin flexible second sheet of insulating plastic disposed generally parallel to the first sheet and having a third strip conductor on the face of the second sheet that is adjacent said one face of the first insulating sheet, the third strip conductor extending between the second strip conductors on the second sheet and being connected to each.

17. The combination defined in claim 16 wherein:

the insulating body is an electronic chip having at least one metal contact on one face, the metal contact being thermocompression bonded directly to one of the strip conductors.

18. The combination defined in claim 17 wherein the metal contact is thermocompression bonded directly to a strip conductor on the first sheet.

19. The combination defined in claim 17 wherein the metal contact is thermocompression bonded directly to a strip conductor on the second sheet.

20. The combination defined in claim 17 wherein:

the electronic chip has at least one metal contact on each of two opposite faces, at least one metal contact on one face of the chip is directly thermocompression bonded to a strip conductor on the first sheet, and at least one metal contact on the other face of the chip is directly thermocompression bonded to a strip conductor on the second sheet.

21. In a semiconductor network, the combination of:

first and second insulating sheets at least one of which is a thin, flexible sheet of plastic, at least one strip conductor bonded to each sheet, the strip conductors being bonded on the facing surfaces of the respective sheets, an electronic chip disposed between the first and second insulating sheet having at least one metal contact on one face of the chip, the metal contact being directly bonded to a strip conductor on one of the sheets, and a strip conductor on the first sheet being directly bonded to a strip conductor on the second sheet.

22. The combination defined in claim 21 wherein:

there is at least one metal contact on each of two opposite faces of the chip, and at least one metal contact on each face is directly bonded to a strip conductor on the sheet adjacent the face.

23. The combination defined in claim 21 wherein:

both sheets are thin, flexible sheets of high temperature plastic, the strip conductors have gold surfaces and are thermocompression bonded to the sheets,
the metal contacts have gold surfaces, and
the strip conductors and metal contacts are bonded by thermocompression bonds.

24. The semiconductor network comprising:
a thin, flexible plastic elongated base sheet having a plurality of metal strip conductors extending generally longitudinally of the base sheet and bonded to one face of the base sheet,
a plurality of semiconductor chips bonded to said one face of the base sheet and having metal contacts formed on at least one face thereof,
at least one thin, flexible plastic secondary sheet disposed generally in parallel relationship to the base sheet and having a plurality of metal strip conductors extending generally transversely of the base sheet, and
connector means interconnecting selected contacts on the chips and selected strip conductors on the sheets to form a common network.

25. The semiconductor network defined in claim 24 wherein the connector means includes jumper wires thermocompression bonded to the selected strip conductors and contacts.

26. The semiconductor network comprising:
a thin, flexible, elongated plastic base sheet,
a thin, flexible, plastic secondary sheet disposed generally parallel to the base sheet,
first and second sets of metal strip conductors bonded to the adjacent faces of the base sheet and the secondary sheet,
a plurality of electronic chips disposed between the base sheet and the secondary sheet,
at least one metal contact on at least one face of at least one electronic chip,
at least one direct electrical connection between a strip conductor of the first set and a strip conductor of the second set, and
at least one direct electrical connection between a contact on an electronic chip and a strip conductor of one of the sets.

27. The semiconductor network defined in claim 26 wherein:
a plurality of the strip conductors of one set extend longitudinally of the base sheet, and
a plurality of the strip conductors of the other set extend transversely of the base sheet to points adjacent a longitudinally edge of the base sheet.

28. The semiconductor network defined in claim 27 further characterized by:
at least one thin, flexible, plastic sheet having a plurality of metal strip conductors bonded to one face thereof, the metal strip conductors being spaced to mate with a least a portion of the strip conductors of said other set at said points adjacent the longitudinal edge of the base sheet and being directly bonded to the strip conductors of said other set.

29. The semiconductor network defined in claim 26 wherein the base sheet is folded a plurality of times along folds extending transversely of the base sheet.

30. The semiconductor array defined in claim 6 wherein said thin flexible sheet of nonconductive plastic is folded along a fold extending transversely of said sheet near the termination of said second sheet.

References Cited

UNITED STATES PATENTS

| | | |
|---|---|---|
| 3,248,779 | 5/1966 | Yuska, et al. |
| 3,372,310 | 3/1968 | Kantor. |
| 3,381,372 | 5/1968 | Capano. |

ROBERT K. SCHAEFER, Primary Examiner

J. R. SCOTT, Assistant Examiner

U.S. Cl. X.R.

29—627; 174—68.5; 338—210